United States Patent [19]

Shimura

[11] Patent Number: 4,933,775

[45] Date of Patent: Jun. 12, 1990

[54] IMAGE ENLARGING OR CONTRACTING METHOD

[75] Inventor: Kazuo Shimura, Kanagawa, Japan

[73] Assignee: Fuji Photo Film Co., Ltd., Kanagawa, Japan

[21] Appl. No.: 331,157

[22] Filed: Mar. 31, 1989

[30] Foreign Application Priority Data

Mar. 31, 1988 [JP] Japan .................................. 63-80066
Mar. 31, 1988 [JP] Japan .................................. 63-80067

[51] Int. Cl.$^5$ ............................................. H04N 1/393
[52] U.S. Cl. .................................... 358/451; 358/454; 358/456
[58] Field of Search ............... 358/283, 287, 298, 451, 358/454, 456, 459, 296, 494, 428; 382/56

[56] References Cited

U.S. PATENT DOCUMENTS

| | | | |
|---|---|---|---|
| 4,651,223 | 3/1987 | Sasaki et al. | 358/284 |
| 4,680,720 | 7/1987 | Yoshii et al. | 358/287 |
| 4,734,783 | 3/1988 | Horikawa | 358/282 |
| 4,740,844 | 4/1988 | Yoshimura | 358/283 |
| 4,809,345 | 2/1989 | Tabata et al. | 358/287 |
| 4,827,352 | 5/1989 | Yoneda et al. | 358/287 |

FOREIGN PATENT DOCUMENTS 0020680 1/1985 Japan .

Primary Examiner—Edward L. Coles, Sr.
Assistant Examiner—Kimyen Vu
Attorney, Agent, or Firm—Sughrue, Mion, Zinn, MacPeak & Seas

[57] ABSTRACT

An image enlarging or contracting method comprises the steps of obtaining groups of interpolated image signal components along every array of original picture elements so that the interpolated picture elements corresponding to the interpolated image signal components of each group are deviated in position in a predetermined direction from the interpolated picture elements corresponding to the interpolated image signal components of every other group. A mean value of the values of the interpolated image signal components corresponding to a set of the interpolated picture elements, which belong to different groups of the interpolated image signal components and which correspond to one another, is calculated. The calculation of the mean value is repeated for every other set of the interpolated picture elements, thereby to ultimately obtain a group of the interpolated image signal components, which are to be used for image enlargement or contraction, along every array of the original picture elements.

6 Claims, 5 Drawing Sheets

IMAGE ENLARGING OR CONTRACTING METHOD

BACKGROUND OF THE INVENTION

1. Field of the Invention

This invention relates to an image enlarging or contracting method for enlarging or contracting an image in a predetermined direction or in two directions by reading out a recorded image in order to obtain image signal components and carrying out interpolation on the image signal components.

2. Description of the Prior Art

Techniques for reading out a recorded image at its picture elements arrayed at predetermined intervals in two directions in order to obtain a plurality of image signal components which represent information about the image, and reproducing an image from the image signal components have heretofore been known in various fields. Also, there have heretofore been known techniques for reproducing an image enlarged or contracted in a predetermined direction by carrying out interpolation on the image signal components along every array of picture elements standing in the predetermined direction in order to obtain a number of interpolated image signal components, which is different from the number of the original image signal components, along every array of picture elements.

FIG. 4 shows how interpolation on image signal components has heretofore been carried out most popularly.

FIG. 4 shows an example wherein an image is enlarged to a size 4/3 times as large as the size of the original image in the horizontal direction. White dots indicate the center points of picture elements arrayed in the predetermined direction, i.e. in the direction of image enlargement or contraction, and a0, a1, a2, ... denote the original image signal components detected at corresponding picture elements. Interpolation is carried out on the image signal components in order to obtain interpolated image signal components b0, b1, b2, ... of picture elements having their center points at black dots shown at the lower part of FIG. 4.

By way of example, the interpolated image signal components b0, b1, b2, ... are obtained by carrying out interpolation of first order expressed as $$b0 = a0,$$

$$b1 = \frac{a0 + 2a1}{3},$$

$$b2 = \frac{a1 + a2}{2}, \ldots$$

The interpolated image signal components b0, b1, b2, ... can also be obtained by carrying out interpolating operations of a high order.

When an image is reproduced from the "x" interpolated image signal components b0, b1, b2, ..., an image enlarged in the predetermined direction as compared with the original image is obtained. An image contracted in a predetermined direction as compared with the original image can be obtained in the same manner.

In cases where interpolation on image signal components is carried out in accordance with the conventional techniques and an image enlarged or contracted in a predetermined direction is reproduced on a display means, such as a CRT display device, from the interpolated image signal components, a moire fringe-shaped artifact arises in the reproduced image, and renders the reproduced image unsuitable for viewing purposes.

Also, there have heretofore been known techniques for reading out a recorded image in order to obtain a plurality of image signal components corresponding to picture elements of the image arrayed at predetermined intervals in two directions, reproducing an image enlarged or contracted in two directions by carrying out interpolation on the image signal components in order to obtain interpolated image signal components corresponding to a number of picture elements, which is different from the number of the original picture elements.

FIG. 5 shows how first-order interpolation on image signal components has heretofore been carried out most popularly in order to enlarge or contract an image in two directions. FIG. 5 shows an example wherein an image is contracted to a size 5/6 times as large as the size of the original image. The "o" marks indicate the center points of the original picture elements arrayed at predetermined intervals in two directions on a recorded image. The center points of the original picture elements are represented by aij where i and j each denote an integer. The "x" marks indicate the center points of interpolated picture elements at which interpolated image signal components are to be obtained by interpolating operations. The center points of the interpolated picture elements are represented by bij where i and j each denote an integer. The image signal components corresponding to the center points aij and bij of the picture elements are also represented by aij and bij. Also, points on the image which are used midway during the interpolating operations and the image signal components corresponding to said points are represented by pi where i denotes an integer.

The distance l on the image shown in FIG. 5 is equal to the distance of six intervals as for aij, and is equal to the distance of five intervals as for bij. Therefore, when an image is reproduced and displayed from the interpolated image signal components bij on an image displaying device such as a CRT display device, the reproduced image is contracted to a size 5/6 times as large as the size of the image reproduced and displayed from the original image signal components aij.

How the interpolated image signal component b11 corresponding to a center point b11 is obtained by the interpolating operations will be described hereinbelow.

Interpolation of first order is carried out as described below:

(1) The value of an image signal component p1 corresponding to a point p1 is calculated by linear interpolation from the values of original image signal components a11 and a12.

(2) The value of an image signal component p2 corresponding to a point p2 is calculated by linear interpolation from the values of original image signal components a21 and a22.

(3) The value of an interpolated image signal component b11 corresponding to a center point b11 is calculated by linear interpolation from the values of the image signal components p1 and p2.

Operations (1), (2) and (3) are repeated for all center points bij in order to obtain the interpolated image signal components bij corresponding to the image contracted to a size 5/6 times as large as the size of the original image.

Also, in order to obtain, for example, the interpolated image signal component b11 corresponding to the center point b11, there has heretofore been known a technique wherein interpolation of second order is carried out by use of the original image signal components at the center points a01, a02, a03, a11, a12, a13, a21, a22 and a23. There has also been known a technique wherein an appropriate value among the values at the center points a11, a12, a21 and a22 located in the vicinity of the center point b11 (for example, the value of the point nearest to the center point b11 among the center points a11, a12, a21 and a22, or the maximum value or the minimum value among the values of the center points a11, a12, a21 and a22) is employed as the value of the interpolated image signal component b11.

In this specification, various techniques for obtaining values of arbitrary points in an image are referred to as the interpolation.

With the conventional interpolating operations described above with reference to FIG. 5, the original image signal components aij have predetermined sharpness, and the sharpness of the interpolated image signal components bij is fixed, depending on a mode of interpolating operations employed. In order to change the sharpness of the interpolated image signal components bij, it was necessary to carry out specific operation processing on the interpolated image signal components bij for changing the sharpness (hereinafter referred to as sharpness operations).

The term "sharpness operations" as used herein means, for example, the operations for averaging the image signal components at surrounding picture elements and blurring the image in cases where the sharpness is to be decreased.

When both the interpolating operations and the sharpness operations are carried out on the image signal components, a longer time is required to complete the operations, and the image processing speed cannot be increased. Also, in order to carry out the operations by a hardware means for the purpose of increasing the image processing speed, it is necessary to use both the apparatus for carrying out the interpolating operations and the apparatus for carrying out the sharpness operations.

SUMMARY OF THE INVENTION

The primary object of the present invention is to provide an image enlarging or contracting method which enables the reproduction of a visible image enlarged or contracted in a predetermined direction so that the visible image is free of a moire fringe-shaped artifact and is suitable for viewing purposes.

Another object of the present invention is to provide an image enlarging or contracting method which simultaneously achieves both the interpolating operations and the sharpness operations, and which increases the image processing speed and can be carried out with a single apparatus.

The present invention provides a first image enlarging or contracting method for reading out a recorded image at its original picture elements arrayed at predetermined intervals in two directions in order to obtain a plurality of original image signal components which represent information about the image, and carrying out interpolation on the original image signal components along every array of the original picture elements standing in a predetermined direction in order to obtain interpolated image signal components corresponding to a number of interpolated picture elements, which number is different from the number of the original picture elements along each picture element array corresponding to the original image signal components, along every array of the original picture elements, thereby to enlarge or contract the image in the predetermined direction, wherein the improvement comprises the steps of:
(i) obtaining a plurality of groups of interpolated image signal components along every array of the original picture elements so that the interpolated picture elements corresponding to the interpolated image signal components of each group are deviated in position in said predetermined direction from the interpolated picture elements corresponding to the interpolated image signal components of every other group,
(ii) calculating a mean value of the values of the interpolated image signal components corresponding to a set of the interpolated picture elements which belong to different groups of the interpolated image signal components and which correspond to one another, and
(iii) repeating the calculation of the mean value for every other set of the interpolated picture elements which belong to different groups of the interpolated image signal components and which correspond to one another, thereby to ultimately obtain a group of said interpolated image signal components, which are to be used for the enlargement or contraction of said image, along every array of the original picture elements.

Experiments carried out by the inventor revealed that a moire fringe-shaped artifact readily arises in an enlarged or contracted image when the enlarged or contracted image is reproduced from image signal components obtained so that the enlarged or contracted image include both the picture elements, the center points of which coincide with the center points of the picture elements of the original image (for example, the picture elements corresponding to b0=a0, b4=a3, b8=a6, ... in FIG. 4), and the picture elements, the center points of which do not coincide with the center points of the picture elements of the original image (for example, the picture elements corresponding to b1, b2, b3, b5, b6, b7, ... in FIG. 4). The state in which center points of picture elements coincide with each other will hereinafter be referred to as "in phase", and the state in which center points of picture elements do not coincide with each other will hereinafter be referred to as "out of phase".

With the first image enlarging or contracting method in accordance with the present invention, a plurality of groups of interpolated image signal components are first obtained along every array of the original picture elements so that the interpolated picture elements corresponding to the interpolated image signal components of each group are deviated in position in the predetermined direction from the interpolated picture elements corresponding to the interpolated image signal components of every other group. Thereafter, a mean value of the values of the interpolated image signal components corresponding to a set of the interpolated picture elements which belong to different groups of the interpolated image signal components and which correspond to one another is calculated. The calculation of the mean value is repeated for every other set of the interpolated picture elements which belong to different groups of the interpolated image signal components and which correspond to one another, thereby to ultimately obtain a group of the interpolated image signal components, which are to be used for the enlargement or contraction of the image, along every array of the original picture elements. Therefore, all interpolated picture elements corresponding to the interpolated image signal components which are obtained ultimately are out of phase with respect to the picture elements of the original image. Accordingly, it is possible to reproduce an enlarged or contracted image which is free of any moire fringe-shaped artifact and which is suitable for viewing purposes.

The present invention also provides a second image enlarging or contracting method for reading out a recorded image at its original picture elements arrayed at predetermined intervals in two directions in order to obtain a plurality of original image signal components which represent information about the image, and carrying out interpolation on the original image signal components in order to obtain interpolated image signal components corresponding to a number of interpolated picture elements, which number is different from the number of the original picture elements, thereby to enlarge or contract the image in two directions, wherein the improvement comprises the steps of:
(i) weighting the values of said original image signal components with areas of an interpolated picture element, which areas are occupied by the original picture elements corresponding to said original image signal components, and
(ii) averaging the weighted values, thereby to calculate the value of an interpolated image signal component corresponding to said interpolated picture element.

The present invention further provides a third image enlarging or contracting method for reading out a recorded image at its original picture elements arrayed at predetermined intervals in two directions in order to obtain a plurality of original image signal components which represent information about the image, and carrying out interpolation on the original image signal components in order to obtain interpolated image signal components corresponding to a number of interpolated picture elements, which number is different from the number of the original picture elements, thereby to enlarge or contract the image in two directions, wherein the improvement comprises the steps of:
(i) carrying out interpolation on the original image signal components in order to obtain intermediately processed image signal components corresponding to a group of picture elements in different positions so that said group extends across a plurality of said original picture elements, and
(ii) averaging the values of the intermediately processed image signal components corresponding to the picture elements, the center points of which are included in an interpolated picture element, thereby to calculate the value of the interpolated image signal component corresponding to said interpolated picture element.

With the second image enlarging or contracting method in accordance with the present invention, the values of the original image signal components are weighted with areas of an interpolated picture element, which areas are occupied by the original picture elements corresponding to the original image signal components, and the weighted values are averaged, thereby to calculate the value of an interpolated image signal component corresponding to the interpolated picture element. Therefore, :t is possible to obtain interpolated image signal components which have sharpness corresponding to the sizes of the interpolated picture elements. When the sizes of the interpolated picture elements are changed during the calculation of the values of the interpolated image signal components, interpolated image signal components having various levels of sharpness can be obtained.

With the third image enlarging or contracting method in accordance with the present invention, interpolation is carried out on the original image signal components in order to obtain intermediately processed image signal components corresponding to a group of picture elements in different positions so that said group extends across a plurality of the original picture elements. The values of the intermediately processed image signal components corresponding to the picture elements, the center points of which are included in an interpolated picture element, are averaged in order to calculate the value of the interpolated image signal component corresponding to the interpolated picture element. Therefore, it is possible to obtain interpolated image signal components which have sharpness corresponding to the sizes of the interpolated picture elements. When the sizes of the interpolated picture elements are changed during the calculation of the values of the interpolated image signal components, interpolated image signal components having various levels of sharpness can be obtained.

As described above, with the second and third image enlarging or contracting methods in accordance with the present invention, both the interpolating operations and the sharpness operations can be achieved simultaneously. Accordingly, the image processing speed can be increased, and the image enlarging or contracting method can be carried out with a single apparatus.

DESCRIPTION OF THE PREFERRED EMBODIMENTS

The present invention will hereinbelow be described in further detail with reference to the accompanying drawings.

Figure 2:
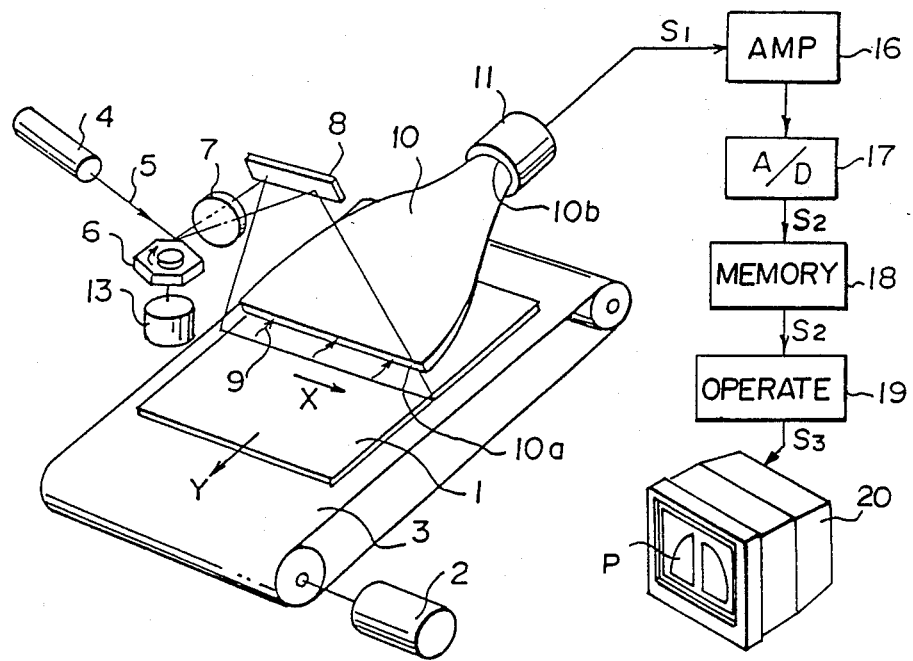
FIG. 2 is a perspective view showing an example of the radiation image read-out and displaying apparatus wherein the image enlarging or contracting method in accordance with the present invention is employed.
Figure 4:
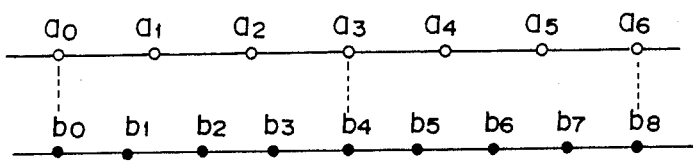
FIG. 4 shows how interpolation on image signal components has heretofore been carried out most popularly.

With reference to FIG. 2, a radiation image read-out and displaying apparatus, wherein the image enlarging or contracting method in accordance with the present invention is employed, utilizes a stimulable phosphor sheet. When the stimulable phosphor which constitutes the stimulable phosphor sheet is exposed to radiation such as X-rays, α-rays, β-rays, γ-rays, cathode rays or ultraviolet rays, it stores part of the energy of the radiation. Then, when the stimulable phosphor which has been exposed to the radiation is exposed to stimulating rays such as visible light, light is emitted by the stimulable phosphor in proportion to the amount of energy stored during exposure to the radiation.

The stimulable phosphor sheet has been exposed to radiation which has passed through an object such as the human body in an image recording apparatus (not shown), and a radiation image of the object is stored on the stimulable phosphor sheet.

A stimulable phosphor sheet 1 on which a radiation image has been stored in the manner described above is placed at a predetermined position in the radiation image read-out and displaying apparatus shown in FIG. 2.

The stimulable phosphor sheet 1 placed in the radiation image read-out and displaying apparatus is conveyed in a sub-scanning direction indicated by the arrow Y by a sheet conveyance means 3 which is constituted of an endless belt or the like and which is operated by a motor 2. On the other hand, stimulating rays 5 produced by a laser beam source 4 are reflected and deflected by a rotating polygon mirror 6 which is being quickly rotated by a motor 3 in the direction indicated by the arrow, and are caused to pass through a converging lens 7 constituted of a fθ lens or the like. The direction of the optical path of the stimulating rays 5 is then changed by a mirror 8, and the stimulating rays 5 are caused to impinge upon the stimulable phosphor sheet 1 and scan it in a main scanning direction indicated by the arrow X, which direction is approximately normal to the sub-scanning direction indicated by the arrow Y. When the stimulable phosphor sheet 1 is exposed to the stimulating rays 5, the exposed portion of the stimulable phosphor sheet 1 emits light 9 in an amount proportional to the amount of energy stored during exposure to the radiation. The emitted light 9 is guided by a light guide member 10, and photoelectrically detected by a photomultiplier 11 which acts as a photodetector. The light guide member 10 is made by forming a light guiding material such as an acrylic plate, and has a linear light input face 10a positioned to extend along the main scanning line on the stimulable phosphor sheet 1, and a ring-shaped light output face 10b positioned so that it is in close contact with a light receiving face of the photomultiplier 11. The emitted light 9 which has entered the light guide member 10 through its light input face 10a is guided through repeated total reflection inside of the light guide member 10, emanates from the light output face 10b, and is received by the photomultiplier 11. In this manner, the amount of the emitted light 9 carrying the radiation image is detected by the photomultiplier 11. An analog signal S1 generated by the photomultiplier 11 is amplified by an amplifier 16. The analog signal S1 after being amplified are sampled by an A/D converter 17 so that the sampled image signal components correspond to picture elements which are arrayed at predetermined intervals in two directions on the radiation image, and the sampled image signal components are digitized. The original image signal components S2 thus obtained are stored in a memory 18. The original image signal components S2 are then read from the memory 18 and fed into an operating section 19. The operating section 19 carries out operations on the original image signal components S2 in order to enlarge or contract the radiation image in a predetermined direction as will be described later, and generates interpolated image signal components S3 corresponding to the enlarged or contracted image. The interpolated image signal components S3 thus obtained are fed into an image displaying means 20 constituted of a CRT display device or the like, and an enlarged or contracted radiation image P is reproduced from the interpolated image signal components S3 and displayed.

An embodiment of the first image enlarging or contracting method in accordance with the present invention will be described hereinbelow.

Figure 1A:
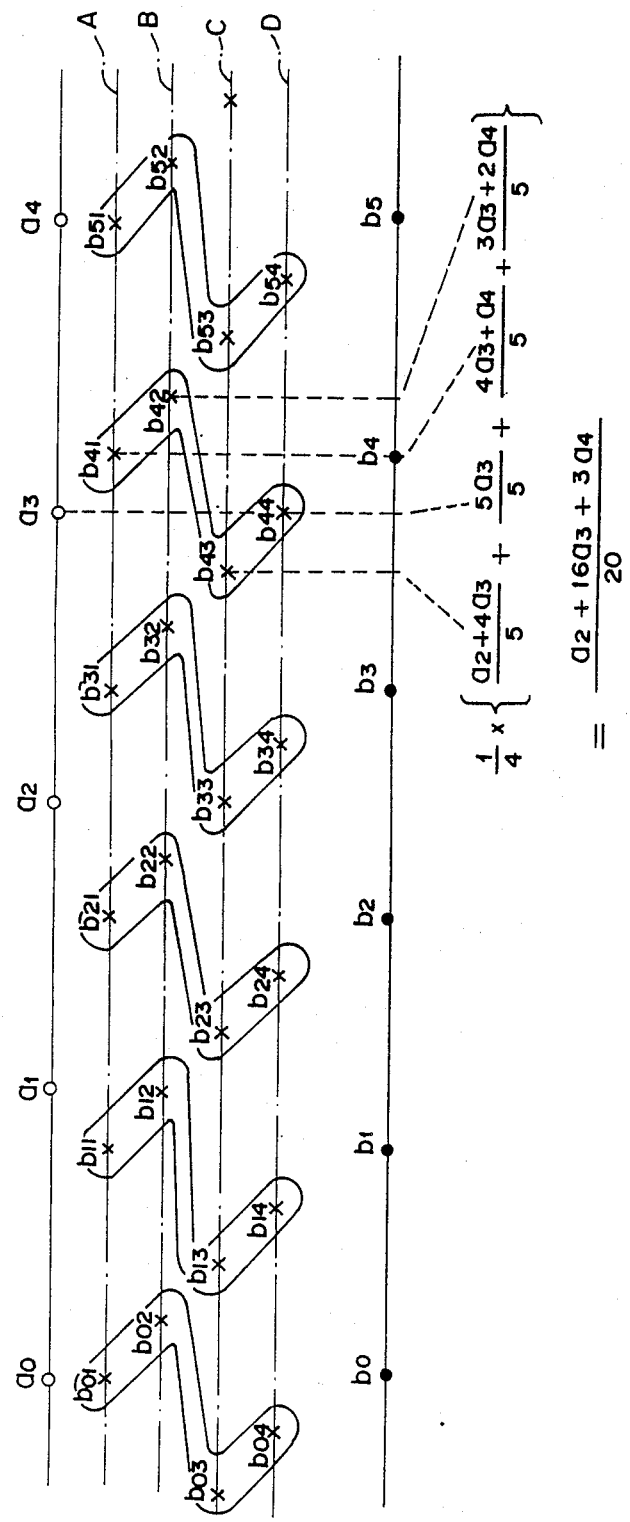
FIGS. 1A and 1B are explanatory views showing examples of how interpolated image signal components corresponding to images enlarged or contracted in a predetermined direction are obtained.
Figure 1B:
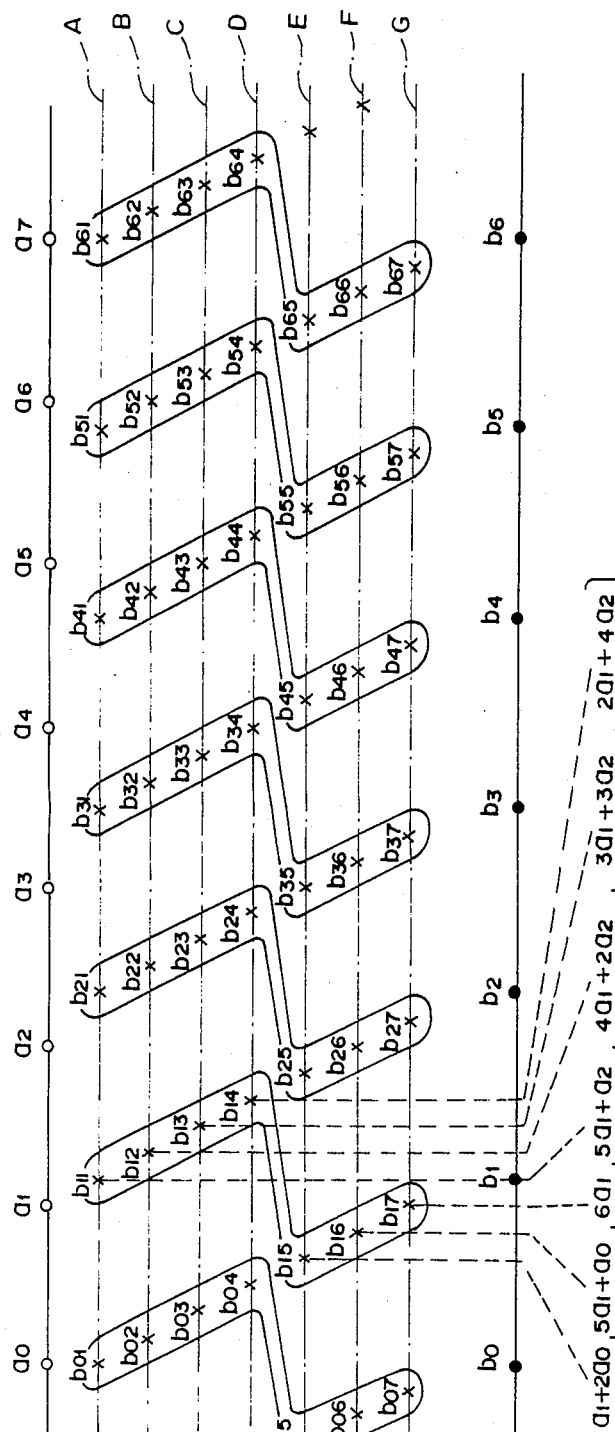

FIGS. 1A and 1B are explanatory views showing examples of how interpolated image signal components corresponding to images enlarged or contracted in a predetermined direction are obtained.

FIG. 1A shows only part of a single array among a plurality of arrays of original picture elements standing in a predetermined direction (in the horizontal direction in this case). In this example, interpolated image signal components corresponding to interpolated picture elements with five intervals intervening among them are obtained per every four intervals of original picture elements arrayed in the predetermined direction in order to enlarge an image to a size 5/4 times as large as the original size.

White dots represent the center points of the original picture elements arrayed in the predetermined direction, and a0, a1, a2, ... denote the original image signal components obtained from the corresponding original picture elements.

The original picture elements are also denoted by the same reference characters (i.e. a0, a1, a2, ...) as the original image signal components. This also applies to the interpolated picture elements and the interpolated image signal components.

The distance of four intervals among the original picture elements a0, a1, a2, a3 and a4 is equally divided into five intervals in order to obtain interpolated picture elements b01, b11, b21, b31, b41 and b51 along a chained line A so that the original picture element a0 is in phase (with respect to the interpolated picture element b01). (In this case, the original picture element a4 is also in phase with respect to the interpolated picture element b51.) In this manner, interpolated image signal components b01, b11, b21, b31, b41 and b51 corresponding to the interpolated picture elements are obtained. Thereafter, said distance is equally divided into five intervals in order to obtain interpolated picture elements b02, b12, b22, b32, b42 and b52 along a chained line B so that the original picture element a1 is in phase (with respect to the interpolated picture element b12). In this manner, interpolated image signal components b02, b12, b22, b32, b42 and b52 corresponding to the interpolated picture elements are obtained. In the same manner, interpolated image signal components b03, b13, b23, b33, b43 and b53 are obtained so that the original picture element a2 is in phase. Also, interpolated image signal components b04, b14, b24, b34, b44 and b54 are obtained so that the original picture element a3 is in phase.

In order to calculate the values of the interpolated image signal components, interpolation using equations of first order (i.e. interpolation of first order) or interpolation of a high order may be carried out on the original image signal components a0, a1, a2, a3 and a4.

In the manner described above, a plurality of groups of interpolated image signal components (four groups indicated by A, B, C and D in the example shown in FIG. 1A) are obtained along every array of the original picture elements (only a single array is shown in FIG. 1A) so that the interpolated picture elements corresponding to the interpolated image signal components of each group are deviated in position in the predetermined direction from the interpolated picture elements corresponding to the interpolated image signal components of every other group. Thereafter, a mean value of the values of the interpolated image signal components corresponding to a set of the interpolated picture elements which belong to different groups of the interpolated image signal components and which correspond to one another (i.e. a set of the interpolated picture elements b01, b02, b03 and b04) is calculated. The calculation of the mean value is repeated for every other set of the interpolated picture elements which belong to different groups of the interpolated image signal components and which correspond to one another (i.e. a set of the interpolated picture elements b11, b12, b13 and b14, a set of the interpolated picture elements b21, b22, b23 and b24, and so on). For example, the mean value of the interpolated image signal components b01, b02, b03 and b04, and the mean value of the interpolated image signal components b11, b12, b13 and b14 are calculated with the formulas expressed as $$b0 = \frac{b01 + b02 + b03 + b04}{4},$$

$$b1 = \frac{b11 + b12 + b13 + b14}{4}$$

In this manner, a group of interpolated image signal components $b0, b1, b2, \ldots$, which are to be used for the enlargement or contraction of the image, are ultimately obtained along every array of the original picture elements. All the interpolated image signal components $b0, b1, b2, \ldots$ thus obtained are out of phase with respect to the original picture elements. Therefore, when an image is reproduced from the interpolated image signal components $b0, b1, b2, \ldots$, a reproduced image free of a moire fringe-shaped artifact can be obtained.

An example of how the value of the interpolated image signal component b4 shown in FIG. 1A may be calculated will be described hereinbelow. In the example described below, interpolation of first order is utilized.

The center point of the interpolated picture element b41 lies on the straight line connecting the center point of the original picture element a3 to the center point of the original picture element a4, and the ratio of the distance between the center point of the original picture elements a3 and the center point of the interpolated picture element b41 to the distance between the center point of the interpolated picture elements b41 and the center point of the original picture element a4 is 1:4. Therefore, the value of the original image signal component a3 corresponding to the original picture element a3 nearer to the interpolated picture element b41 is weighted with a larger weight factor which is inversely proportional to the ratio of the distances, and the value of the interpolated image signal component b41 is calculated with the formula expressed as $$b41 = \frac{4a3 + a4}{5} \quad (1)$$

In the same manner, the values of the interpolated image signal components b42, b43 and b44 are calculated with the formulas expressed as $$b42 = \frac{3a3 + 2a4}{5} \quad (2)$$

$$b43 = \frac{a2 + 4a3}{5} \quad (3)$$

$$b44 = \frac{5a3}{5} \quad (4)$$

The ultimately interpolated image signal component b4 is calculated by averaging the values of Formulas (1) through (4) with the formula expressed as $$b4 = \frac{b41 + b42 + b43 + b44}{4} \quad (5)$$
$$= \frac{a2 + 16a3 + 3a4}{20}$$

In the manner described above, the ultimately interpolated image signal components $b0, b1, b2, \ldots$ are obtained along every array of the original picture elements. When an image is reproduced from the ultimately interpolated image signal components $b0, b1, b2, \ldots$ on a CRT display device or the like, an image enlarged to a size 5/4 times as large as the size of the original image in the horizontal direction in FIG. 1A is displayed.

In the operations described above, the interpolation of first order and the arithmetical averaging are employed. However, interpolating operations of a high order and different averaging operations such as the geometric averaging may be employed. Also, in the operations described above, the mean value of the values of the interpolated image signal components corresponding to every set of the interpolated picture elements, which belong to the groups indicated by the chained lines A, B, C and D and which correspond to one another, is calculated. Or instead, the mean value of the values of the interpolated image signal components corresponding to every set of the interpolated picture elements, which belong to the groups indicated by the chained lines A, B and C and which correspond to one another, may be calculated. Alternatively, the mean value of the values of the interpolated image signal components corresponding to every set of the interpolated picture elements, which belong to the groups indicated by the chained lines A and B and which correspond to one another, may be calculated.

FIG. 1B shows an example of how an image is contracted to a size 6/7 times as large as the size of the original image in a predetermined direction (in the horizontal direction in this case). In FIG. 1B, only part of a single array among a plurality of arrays of original picture elements standing in the predetermined direction is shown. In FIG. 1B, similar elements are numbered with the same reference characters with respect to FIG. 1A.

The values of the interpolated image signal components $b11, b12, \ldots, b17$ are calculated by interpolation of first order with formulas expressed as $$b11 = \frac{5a1 + a2}{6} \quad (6)$$

$$b12 = \frac{4a1 + 2a2}{6} \quad (7)$$

$$b13 = \frac{3a1 + 3a2}{6} \quad (8)$$

$$b14 = \frac{2a1 + 4a2}{6} \quad (9)$$

$$b15 = \frac{4a1 + 2a0}{6} \quad (10)$$

$$b16 = \frac{5a1 + a0}{6} \quad (11)$$

$$b17 = \frac{6a1}{6} \quad (12)$$

The arithmetical mean of the values of Formulas (6) through (12) is calculated with the formula expressed as $$b1 = \frac{3a0 + 29a1 + 10a2}{42} \quad (13)$$

In order to calculate the value of the interpolated image signal component b1, the values of all the interpolated image signal components b11, b12, ..., b17 calculated with Formulas (6) through (12) need not necessarily be averaged. But instead, the mean value of the values of only the interpolated image signal components b11, b12, b13 and b14 may be calculated.

In the manner described above, the ultimately interpolated image signal components b0, b1, b2, ... are obtained along ever array of the original picture elements. When an image is reproduced from the ultimately interpolated image signal components b0, b1, b2, ... on a CRT display device or the like, an image contracted to a size 6/7 times as large as the size of the original image in the horizontal direction in FIG. 1B is displayed.

The first image enlarging or contracting method in accordance with the present invention is not limited to the embodiments described above, and is applicable to various cases where an image is to be enlarged or contracted in a predetermined direction.

Embodiments of the second and third image enlarging or contracting methods in accordance with the present invention will be described hereinbelow.

Figure 3:
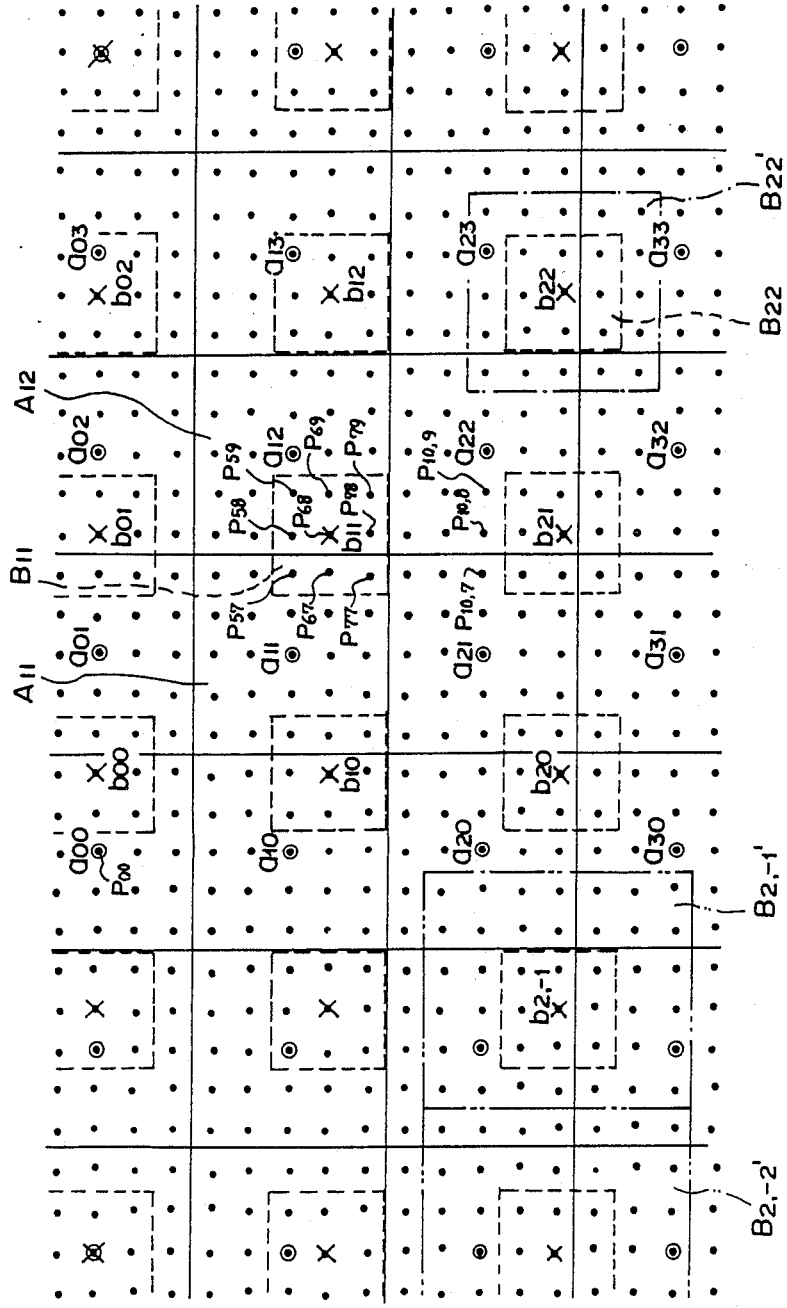
FIG. 3 is an explanatory view showing an example of how an image is enlarged or contracted in two directions.
Figure 5:
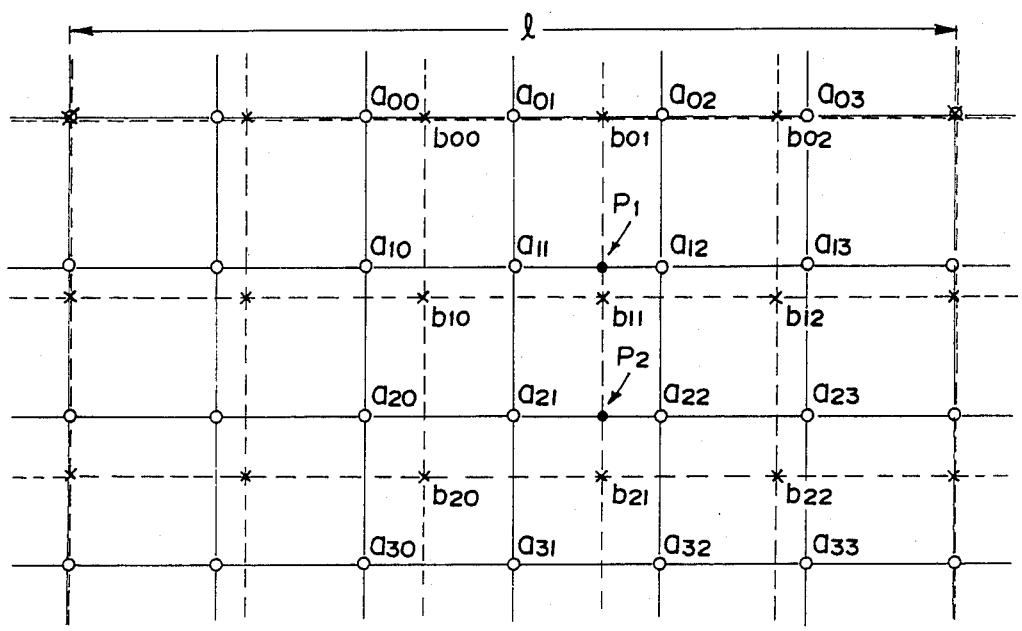
FIG. 5 shows how first-order interpolation on image signal components has heretofore been carried out most popularly in order to enlarge or contract an image in two directions.

FIG. 3 shows how an image may be enlarged or contracted in two directions. By way of example, FIG. 3 shows the cases where an image is contracted to a size 5/6 times as large as the size of the original image as in the case of the conventional method described above with reference to FIG. 5.

In FIG. 3, the "o" marks indicate the center points of the original picture elements arrayed at predetermined intervals in two directions on a recorded image. The original picture elements correspond to regions Aij where i and j each denote an integer, which regions are surrounded by solid lines. The center points of the original picture elements are represented by aij where i and j each denote an integer. The "x" marks indicate the center points of interpolated picture elements at which interpolated image signal components are to be obtained by interpolating operations. The interpolated picture elements correspond to regions Bij where i and j each denote an integer, which regions are surrounded by broken lines. The center points of the interpolated picture elements Bij are represented by bij where i and j each denote an integer. The original image signal components corresponding to the original picture elements Aij are represented by the same reference characters aij as the center points aij of the original picture elements Aij. Also, the interpolated image signal components corresponding to the interpolated picture elements Bij are represented by the same reference characters bij as the center points bij of the interpolated picture elements Bij. Points on the image which are used midway during the interpolating operations and the image signal components corresponding to said points are represented by pmn where m and n each denote an integer.

An embodiment of the second image enlarging or contracting method in accordance with the present invention will first be described hereinbelow. The value of an interpolated image signal component b11 corresponding to an interpolated picture element B11 is calculated as described below.

The whole area of the interpolated picture element B11 corresponding to the interpolated image signal component b11 the value of which is to be calculated is occupied by original picture elements A11 and A12. The ratio of the area of the interpolated picture element B11, which area is occupied by the original picture element A11, to the area of the interpolated picture element B11, which area is occupied by the original picture element A12, is expressed as Area of B11 occupied by A11:area of B11 occupied by A12=3:6 (14)

Therefore, the value of the interpolated image signal component b11 is calculated with the formula expressed as $$b11 = \frac{3a11 + 6a12}{9} \quad (15)$$

$$= \frac{a11 + 2a12}{3}$$

The operations of Formulas (14) and (15) can be rewritten as described below.

A plurality of points pmn indicated by dots are positioned so that a group of the points pmn positioned within each original picture element Aij equally have the value of the original image signal component aij which corresponds to said original picture element Aij. The values of the image signal components pmn corresponding to the points pmn positioned within each interpolated picture element Bij are averaged in order to calculate the value of the interpolated image signal component bij corresponding to said interpolated picture element Bij. For example, in order to calculate the value of the interpolated image signal component b11, the mean value of the values of image signal components p57, p67, p77, p58, p68, p78, p59, p69 and p79 corresponding to points p57, p67 and p77 of the original picture element A11, which points are located within the interpolated picture element B11, and corresponding to points p58, p68, p78, p59, p69 and p79 of the original picture element A12, which points are located within the interpolated picture element B11, is calculated. The calculation is expressed as $$b11 = \qquad (16)$$

$$\frac{p57 + p67 + p77 + p58 + p68 + p78 + p59 + p69 + 79}{9}$$

On the other hand, the following formulas obtain:

$$p57 = p67 = p77 = a11 \qquad (17)$$

$$p58 = p68 = p78 = p59 = p69 = p79 = a12 \qquad (18)$$

Substitution of Formulas (17) and (18) into Formula (16) yields the formula expressed as $$b11 = \frac{3a11 + 6a12}{9} = \frac{a11 + 2a12}{3} \qquad (19)$$

Formula (19) is the same as Formula (15).

The operation of Formula (15) or (19) is repeated for all the interpolated picture elements Bij. In this manner, interpolated image signal components bij having sharpness corresponding to the sizes of the interpolated picture elements Bij can be obtained. Specifically, in cases where all the interpolated picture elements have a larger size as indicated by an interpolated picture element B22', the values of a larger number of the image signal components pij are averaged, and therefore the sharpness can be decreased as compared with the cases where all the interpolated picture elements have the same size as the interpolated picture element B22.

The sizes of the interpolated picture elements may be further increased as indicated by an interpolated picture element B2,-1' so that part of the interpolated picture element B2,-1' overlaps part of an adjacent interpolated picture element B2,-2'.

Also, in the embodiment of FIG. 3, shapes of the interpolated picture elements Bij are square. However, the interpolated picture elements may have any other shapes, for example, rectangular shapes in order to change the sharpness in accordance with directions. The second image enlarging or contracting method in accordance with the present invention is also applicable when an image is to be enlarged or contracted to different scales in vertical and horizontal directions.

Furthermore, in the embodiment of FIG. 3, the mean value of the values of image signal components corresponding to the points pmn positioned within each interpolated picture element Bij is calculated by the arithmetical averaging. However, any other averaging process may be employed for this purpose. For example, the geometric averaging may be employed, or a median value may be employed.

In the embodiment of FIG. 3, the original picture elements Aij are positioned so that no space intervenes between edges thereof. However, the original picture elements Aij may be positioned so that a space intervenes between adjacent original picture elements Aij or the adjacent original picture elements Aij partially overlap upon each other, as in the case of the aforesaid interpolated picture elements. Also, the shapes of the original picture elements Aij are not limited to squares, and may be rectangular or the like.

An embodiment of the third image enlarging or contracting method in accordance with the present invention will be described hereinbelow with reference to FIG. 3.

In the second image enlarging or contracting method in accordance with the present invention, processes for calculating the values of the image signal components corresponding to the points pmn is omitted, and the values of the interpolated image signal components bij are calculated on the assumption that all the image signal components corresponding to the points pmn positioned within each original picture element Aij have the same value. On the other hand, the third image enlarging or contracting method in accordance with the present invention is characterized by carrying out interpolating operations in order to calculate the values of the image signal components corresponding to the points pmn. Specifically, interpolation is carried out on the original image signal components aij in order to obtain intermediately processed image signal components pmn corresponding to a group of picture elements (having their center points pmn) in different positions so that said group extends across a plurality of the original picture elements Aij. The values of the intermediately processed image signal components pmn corresponding to the picture elements, the center points pmn of which are included in each interpolated picture element Bij, are averaged. In this manner, the value of the interpolated image signal component corresponding to each interpolated picture element Bij is calculated. By way of example, interpolation of first order may be employed in order to calculate the values of the intermediately processed image signal components pmn.

By way of example, how the value of the interpolated image signal component b11 may be calculated with interpolation of first order will be described below.

Linear interpolation is carried out on the original image signal components a11 and a12 in order to calculate the values of the intermediately processed image signal components p57, p58 and p59. The operations of the linear interpolation are expressed as $$p57 = \frac{3a11 + 2a12}{5} \qquad (20)$$

$$p58 = \frac{2a11 + 3a12}{5} \qquad (21)$$

$$p59 = \frac{a11 + 4a12}{5} \qquad (22)$$

Linear interpolation is carried out on the original image signal components a21 and a22 in order to calculate the values of the intermediately processed image signal components p10,7, p10,8 and p10,9. The operations of the linear interpolation are expressed as $$p10,7 = \frac{3a21 + 2a22}{5} \qquad (23)$$

$$p10,8 = \frac{2a21 + 3a22}{5} \qquad (24)$$

$$p10,9 = \frac{a21 + 4a22}{5} \qquad (25)$$

Thereafter, values of the intermediately processed image signal components p67 and p77 are calculated from the values of the intermediately processed image signal components p57 and p10,7. Also, values of the intermediately processed image signal components p68 and p78 are calculated from the values of the intermediately processed image signal components p58 and p10,8, and values of the intermediately processed image signal components p69 and p79 are calculated from the values of the intermediately processed image signal components p59 and p10,9. The operations are expressed as $$p67 = \frac{4p57 + p10,7}{5} \quad (26)$$

$$p77 = \frac{3p57 + 2p10,7}{5} \quad (27)$$

$$p68 = \frac{4p58 + p10,8}{5} \quad (28)$$

$$p78 = \frac{3p58 + 2p10,8}{5} \quad (29)$$

$$p69 = \frac{4p59 + p10,9}{5} \quad (30)$$

$$p79 = \frac{3p59 + 2p10,9}{5} \quad (31)$$

Substitution of Formulas (20) through (25) into Formulas (26) through (31) yields the formulas expressed as $$p67 = \frac{12a11 + 8a12 + 3a21 + 2a22}{25} \quad (32)$$

$$p77 = \frac{9a11 + 6a12 + 6a21 + 4a22}{25} \quad (33)$$

$$p68 = \frac{8a11 + 12a12 + 2a21 + 3a22}{25} \quad (34)$$

$$p78 = \frac{6a11 + 9a12 + 4a21 + 6a22}{25} \quad (35)$$

$$p69 = \frac{4a11 + 16a12 + a21 + 4a22}{25} \quad (36)$$

$$p79 = \frac{3a11 + 12a12 + 2a21 + 8a22}{25} \quad (37)$$

Therefore, the value of the interpolated image signal component b11 is calculated with the formula expressed as $$b11 = \quad (38)$$

$$\frac{p57 + p67 + p77 + p58 + p68 + p78 + p59 + p69 + p79}{9} =$$

$$\frac{8a11 + 12a12 + 2a21 + 3a22}{25}$$

The operation of Formula (38) is repeated for all the interpolated picture elements Bij. In this manner, interpolated image signal components bij having sharpness corresponding to the sizes of the interpolated picture elements Bij can be obtained.

The embodiment of the third image enlarging or contracting method in accordance with the present invention may be modified in various manners as in the embodiment of the second image enlarging or contracting method in accordance with the present invention. For example, instead of the square shapes, the interpolated picture elements Bij may have any other shapes.

The second and third image enlarging or contracting methods in accordance with the present invention are not limited to the aforesaid embodiments, and are applicable to various cases where an image is to be enlarged or contracted in two directions.

Also, the first, second and third image enlarging or contracting methods in accordance with the present invention are applicable to the radiation image read-out and displaying apparatus shown in FIG. 2 and various other apparatuses, for example, an apparatus for reading out an image recorded on a sheet of X-ray film in order to detect image signal components representing information about the image, and reproducing an image from the image signal components.

I claim:

1. An image enlarging or contracting method for reading out a recorded image at its original picture elements arrayed at predetermined intervals in two directions in order to obtain a plurality of original image signal components which represent information about the image, and carrying out interpolation on the original image signal components along every array of the original picture elements standing in a predetermined direction in order to obtain interpolated image signal components corresponding to a number of interpolated picture elements, which number is different from the number of the original picture elements along each picture element array corresponding to the original image signal components, along every array of the original picture elements, thereby to enlarge or contract the image in the predetermined direction, wherein the improvement comprises the steps of:
(i) obtaining a plurality of groups of interpolated image signal components along every array of the original picture elements so that the interpolated picture elements corresponding to the interpolated image signal components of each group are deviated in position in said predetermined direction from the interpolated picture elements corresponding to the interpolated image signal components of every other group,
(ii) calculating a mean value of the values of the interpolated image signal components corresponding to a set of the interpolated picture elements which belong to different groups of the interpolated image signal components and which correspond to one another, and
(iii) repeating the calculation of the mean value for every other set of the interpolated picture elements which belong to different groups of the interpolated image signal components and which correspond to one another, thereby to ultimately obtain a group of said interpolated image signal components, which are to be used for the enlargement or contraction of said image, along every array of the original picture elements.

2. A method as defined in claim 1 wherein said recorded image is a radiation image stored on a stimulable phosphor sheet, and said original image signal components are detected by exposing said stimulable phosphor sheet to stimulating rays which cause it to emit light in proportion to the amount of energy stored thereon during exposure to radiation, and photoelectrically detecting the emitted light.

3. An image enlarging or contracting method for reading out a recorded image at its original picture elements arrayed at predetermined intervals in two directions in order to obtain a plurality of original image signal components which represent information about the image, and carrying out interpolation on the original image signal components in order to obtain interpolated image signal components corresponding to a number of interpolated picture elements, which number is different from the number of the original picture elements, thereby to enlarge or contract the image in two directions, wherein the improvement comprises the steps of:

(i) weighting the values of said original image signal components with areas of an interpolated picture element, which areas are occupied by the original picture elements corresponding to said original image signal components, and
(ii) averaging the weighted values, thereby to calculate the value of an interpolated image signal component corresponding to said interpolated picture element.

4. A method as defined in claim 3 wherein said recorded image is a radiation image stored on a stimulable phosphor sheet, and said original image signal components are detected by exposing said stimulable phosphor sheet to stimulating rays which cause it to emit light in proportion to the amount of energy stored thereon during exposure to radiation, and photoelectrically detecting the emitted light.

5. An image enlarging or contracting method for reading out a recorded image at its original picture elements arrayed at predetermined intervals in two directions in order to obtain a plurality of original image signal components which represent information about the image, and carrying out interpolation on the original image signal components in order to obtain interpolated image signal components corresponding to a number of interpolated picture elements, which number is different from the number of the original picture elements, thereby to enlarge or contract the image in two directions, wherein the improvement comprises the steps of:
(i) carrying out interpolation on the original image signal components in order to obtain intermediately processed image signal components corresponding to a group of picture elements in different positions so that said group extends across a plurality of said original picture elements, and
(ii) averaging the values of the intermediately processed image signal components corresponding to the picture elements, the center points of which are included in an interpolated picture element, thereby to calculate the value of the interpolated image signal component corresponding to said interpolated picture element.

6. A method as defined in claim 5 wherein said recorded image is a radiation image stored on a stimulable phosphor sheet, and said original image signal components are detected by exposing said stimulable phosphor sheet to stimulating rays which cause it to emit light in proportion to the amount of energy stored thereon during exposure to radiation, and photoelectrically detecting the emitted light.

* * * * *